(12) United States Patent
Frank

(10) Patent No.: US 8,367,774 B2
(45) Date of Patent: *Feb. 5, 2013

(54) PROCESS FOR AGGLOMERATION OF SUPERABSORBENT POLYMER FINE PARTICLES

(75) Inventor: Markus Frank, Baden-Baden (DE)

(73) Assignee: Evonik Stockhausen GmbH, Krefeld (DE)

( * ) Notice: Subject to any disclaimer, the term of this patent is extended or adjusted under 35 U.S.C. 154(b) by 426 days.

This patent is subject to a terminal disclaimer.

(21) Appl. No.: 12/789,644

(22) Filed: May 28, 2010

(65) Prior Publication Data

US 2010/0234531 A1    Sep. 16, 2010

Related U.S. Application Data

(63) Continuation of application No. 10/565,577, filed as application No. PCT/EP2004/008183 on Jul. 22, 2004, now Pat. No. 7,776,984.

(30) Foreign Application Priority Data

Jul. 25, 2003 (DE) .................................. 103 34 271

(51) Int. Cl.
C08F 8/00 (2006.01)

(52) U.S. Cl. ..................................................... 525/192

(58) Field of Classification Search ............... 526/317.1, 526/318; 525/192
See application file for complete search history.

(56) References Cited

U.S. PATENT DOCUMENTS

| | | | |
|---|---|---|---|
| 4,076,663 A | 2/1978 | Masuda et al. | |
| 4,179,367 A | 12/1979 | Barthell et al. | |
| 4,286,082 A | 8/1981 | Tsubakimoto et al. | |
| 4,587,308 A | 5/1986 | Makita et al. | |
| 5,350,799 A * | 9/1994 | Woodrum et al. | ........... 525/54.3 |
| 5,409,771 A | 4/1995 | Dahmen et al. | |
| 5,455,284 A | 10/1995 | Dahmen et al. | |
| 5,610,220 A * | 3/1997 | Klimmek et al. | ............. 524/417 |
| 5,672,633 A | 9/1997 | Brehm et al. | |
| 5,712,316 A | 1/1998 | Dahmen et al. | |
| 6,087,450 A | 7/2000 | Breitbach et al. | |
| 6,133,193 A | 10/2000 | Kajikawa et al. | |
| 6,143,821 A | 11/2000 | Houben | |
| 7,169,843 B2 | 1/2007 | Smith et al. | |
| 7,241,820 B2 | 7/2007 | Smith et al. | |
| 7,427,650 B2 | 9/2008 | Smith et al. | |
| 7,776,984 B2 * | 8/2010 | Frank | .......................... 526/317.1 |
| 2004/0213892 A1 | 10/2004 | Gerd et al. | |
| 2005/0013992 A1 * | 1/2005 | Azad et al. | .................... 428/327 |
| 2007/0167560 A1 | 7/2007 | Smith et al. | |
| 2008/0009616 A1 | 1/2008 | Frank et al. | |

FOREIGN PATENT DOCUMENTS

| | | |
|---|---|---|
| DE | 2706135 | 8/1978 |
| DE | 3503458 | 8/1985 |
| DE | 3741158 A1 | 6/1989 |
| DE | 4020780 | 8/1991 |
| DE | 4021847 A | 1/1992 |
| DE | 4244548 | 7/1994 |
| DE | 4418818 | 1/1995 |
| DE | 4333056 A1 | 3/1995 |
| DE | 19543366 | 5/1997 |
| DE | 19543368 | 5/1997 |
| EP | 0513780 A | 11/1992 |
| EP | 0522570 A | 1/1993 |
| EP | 0692514 A | 1/1996 |
| EP | 0695763 A1 | 2/1996 |
| EP | 0721354 A | 7/1996 |
| JP | 06313042 A | 11/1994 |
| JP | 06313044 A | 11/1994 |
| WO | 9115177 A | 10/1991 |
| WO | 9934843 | 7/1999 |
| WO | 0189591 | 11/2001 |

* cited by examiner

*Primary Examiner* — Ling Choi
*Assistant Examiner* — Lanee Reuther
(74) *Attorney, Agent, or Firm* — Smith Moore Leatherwood LLP; Philip P. McCann

(57) ABSTRACT

Among other things, a process for producing an agglomerated superabsorbent polymer particle and an agglomerated superabsorbent polymer particle are disclosed. The process comprises the steps of:
  (A) bringing superabsorbent polymer fine particles having at least about 40 wt. %, a particle size of less than about 150 μm into contact with a fluid comprising to more than about 10 wt. % a cross-linkable, uncrosslinked polymer based on polymerized, ethylenically unsaturated, acid group-bearing monomers or salts thereof; and
  (B) cross-linking the uncrosslinked polymer by heating the superabsorbent polymer fine particles and the fluid to a temperature from about 20 to about 300° C., so that the cross-linkable, uncrosslinked polymer at least partially crosslinks.

10 Claims, No Drawings

PROCESS FOR AGGLOMERATION OF SUPERABSORBENT POLYMER FINE PARTICLES

This application is a continuation application of U.S. application Ser. No. 10/565,577 filed on Jan. 23, 2006 now U.S. Pat. No. 7,776,984, now pending, which is a national stage application under 35 U.S.C. 371 of international application No. PCT/EP2004/008183 filed Jul. 22, 2004, which claims priority to German Application No. DE 103 34 271.0 filed Jul. 25, 2003, the disclosures of which are expressly incorporated herein by reference.

The present invention relates to a process for producing an agglomerated superabsorbent polymer particle, superabsorbent polymer particles obtainable by this process, superabsorbent polymer particles comprising superabsorbent polymer fine particles, a composite comprising superabsorbent polymer particles and a substrate, a process for producing a composite, a composite obtainable by this process, chemical products comprising the superabsorbent polymer particles according to an embodiment of the present invention or the composite according to an embodiment of the present invention, the use of the superabsorbent polymer particles according to an embodiment of the present invention or of the composite according to an embodiment of the present invention in chemical products, the use of an uncrosslinked polymer as well as the use of a fluid comprising an uncrosslinked polymer.

Superabsorbent polymers have the ability to absorb large quantities of aqueous liquids. They are therefore often used in hygiene articles such as diapers or feminine sanitary articles.

The production of the superabsorbent polymers can occur by reverse phase suspension polymerization, by reverse phase emulsion polymerization, by aqueous solution polymerization, or by solution polymerization in an organic solvent. The superabsorbent polymers obtained in these ways are dried and then optionally pulverized.

The superabsorbent polymer particles obtainable by the above-mentioned polymerization processes, inter alia, comprise a non-negligible portion of fine particles, wherein fine particles comprise particles with an average particle size of less than about 55 μm. The portion of these fine particles can amount to up to about 35 wt. %, depending on the process of production of the superabsorbent polymer. The fine particles in the production of hygiene articles are not only difficult to manipulate but also have a particularly strong tendency to form dust, which may be problematic in particular with respect to the health of personnel employed in the production of articles of this type. For this reason, the superabsorbent polymer particles are processed by sieving before their use in the production of hygiene articles, whereby the fine particles with a particle size of less than about 150 μm are separated.

Some processes have been described in the literature in which the superabsorbent polymer fine particles separated in this way agglomerate to larger particle structures and can thus be reintroduced into the process for producing hygiene articles.

DE-A-40 21 847, EP-A-0 721 354, and EP-A-0 513 780 describe the crosslinking polymerization of hydrophilic monomers in aqueous solutions with addition of superabsorbent polymer fine particles. A gel is formed, which must be comminuted, dried, ground, and sieved.

EP-A-0 692 514 describes the agglomeration of superabsorbent polymer fine particles by impregnating the particles with a polymerizable aqueous solution of an acrylic monomer and a crosslinker, with subsequent polymerization by heating.

WO-A-91/15177 describes a process in which absorbent precursor particles are crosslinked with an inter-particle crosslinking agent. This inter-particle crosslinking agent is a non-polymeric, polyfunctional compound such as polyisocyanates, polyamines, or polyalcohols.

EP-A-0 522 570 describes the agglomeration of superabsorbent polymer fine particles in which the particles are mixed with a polymerizable monomer solution and produced by suspension polymerization.

DE-A-37 41 158 describes the agglomeration of superabsorbent polymer fine particles with a solution or dispersion comprising an agglomeration auxiliary, whereby as an agglomeration auxiliary, aqueous solutions of uncrosslinked polyacrylates are also used. An additional crosslinker for the polymers is not used. The solutions are preferably applied in a fluidized bed. The disadvantage of the process described in this art is that the stability of the agglomerate under mechanical stress is very low.

JP-06313042 and JP-06313044 describe a process in which absorbent fine particles are brought into contact with a solution comprising a binding agent as well as a crosslinker. The binding agent is a solution of water-soluble polymers, such as a polyacrylate solution. The aqueous solutions used as binding agents in these processes contain at most about 10 wt. % of the water-soluble polymer. The disadvantage of the process described in this art is that after the agglomeration, significant quantities of fine particles remain that are not agglomerated.

Embodiments of the present invention generally overcome the disadvantages arising from the state of the art.

An embodiment of the present invention is to provide a process with which superabsorbent polymer particles can be obtained by agglomeration of superabsorbent polymer fine particles, wherein these superabsorbent polymer particles are not inferior in their properties to the agglomerates obtainable from superabsorbent polymer fine particles known from the art, in particular in their absorption properties as well as with respect to their stability to mechanical stress.

Another embodiment according to the present invention comprises making available superabsorbent polymer particles that can be obtained by agglomeration of superabsorbent polymer fine particles and that are well suited for incorporation into hygiene articles.

In addition, yet another embodiment according to the present invention comprises making available superabsorbent polymer particles that can be obtained by agglomeration of superabsorbent polymer fine particles, which can be exactly dosed without any problem in their incorporation into hygiene articles, in particular with reduced occurrence of caking and blockages.

These embodiments include a process for producing superabsorbent polymer particles comprising as steps:

(A) bringing superabsorbent polymer fine particles that have, to at least about 40 wt. % in one aspect, in another aspect to at least about 70 wt. %, in yet another aspect to at least about 80 wt. %, and in even yet another aspect to at least about 90 wt. %, a particle size of less than about 150 μm, determined according to ERT 420.1-99, into contact with a fluid comprising more than about 10 wt. % in one aspect, in another aspect more than about 15 wt. %, in yet another aspect more than about 17 wt. %, and in even yet another aspect more than about 20 wt. % and in even yet a further aspect more than about 25 wt. %, based on the total weight of the fluid, of a crosslinkable, uncrosslinked polymer, which polymer is based on polymerized, ethylenically unsaturated, acid groups-bearing monomers or salts thereof to at least about 20 wt. % in one aspect, in another aspect to at least about 50 wt. %, in yet another aspect to at least about 80 wt. %, and in even yet another aspect to at least about 90 wt. %, based on the total weight of the crosslinkable uncrosslinked polymer;
(B) crosslinking the uncrosslinked polymer by heating the superabsorbent polymer fine particles brought into contact with a fluid to a temperature within a range from about 20° C. to about 300° C. in one aspect, in another aspect within a range from about 50° C. to about 250° C., and in yet another aspect within a range from about 100° C. to about 200° C., so that in one aspect the crosslinkable, uncrosslinked polymer is at least partially crosslinked;
whereby
(a) the crosslinkable, uncrosslinked polymer comprises, besides the polymerized, ethylenically unsaturated, acid groups-bearing monomers, further polymerized, ethylenically unsaturated monomers (M) which can react with polymerized acid groups-bearing monomers in a condensation reaction, in an addition reaction or in a ring opening reaction, and/or
(b) the fluid comprises, besides the cross-linkable, uncrosslinked polymer, a crosslinker The superabsorbent polymer fine particles used in the above-described process according to embodiments of the present invention can be based on:
($\alpha$1) about 0.1 wt. % to about 99.999 wt. % in one aspect, in another aspect about 20 wt. % to about 98.99 wt. %, and in yet another aspect about 30 wt. % to about 98.95 wt. % of polymerized, ethylenically unsaturated, acidic group-containing monomers or salts thereof, or polymerized, ethylenically unsaturated monomers containing a protonated or a quaternary nitrogen, or mixtures thereof, wherein mixtures comprising at least ethylenically unsaturated, acidic groups-containing monomers, preferably acrylic acid, are one aspect;
($\alpha$2) 0 wt. % to about 70 wt. % in one aspect, in another aspect about 1 wt. % to about 60 wt. %, and in yet another aspect about 1 wt. % to about 40 wt. % of polymerized, ethylenically unsaturated monomers which can be co-polymerized with ($\alpha$1);
($\alpha$3) about 0.001 wt. % to about 10 wt. % in one aspect, in another aspect about 0.01 wt. % to about 7 wt. %, and in yet another aspect about 0.05 wt. % to about 5 wt. % of one or more cross-linkers;
($\alpha$4) 0 wt. % to about 30 wt. % in one aspect, in another aspect about 1 wt. % to about 20 wt. %, and in yet another aspect about 5 wt. % to about 10 wt. % of water-soluble polymers; and
($\alpha$5) 0 wt. % to about 20 wt. % in one aspect, in another aspect about 0.01 wt. % to about 7 wt. %, and in yet another aspect about 0.05 wt. % to about 5 wt. % of one or more auxiliaries, wherein the sum of the component weights ($\alpha$1) to ($\alpha$5) amounts to about 100 wt. %.

The monoethylenically unsaturated, acid group-containing monomers ($\alpha$1) can be partially or fully, in one aspect partially neutralized. In one aspect, the monoethylenically unsaturated, acid group-containing monomers are neutralized to at least about 25 mol. %, in another aspect to at least about 50 mol. %, and in yet another aspect to about 50 mol. % to about 90 mol. %. The neutralization of the monomers ($\alpha$1) can occur before and also after the polymerization. Further, the neutralization can occur with alkali metal hydroxides, alkaline earth metal hydroxides, ammonia as well as carbonates and bicarbonates. In addition, every further base which forms a water-soluble salt with the acid is conceivable. A mixed neutralization with different bases is also conceivable. Neutralization with ammonia or with alkali metal hydroxides is one aspect, and with sodium hydroxide or with ammonia is another aspect.

Furthermore, the free acid groups may predominate in a polymer, so that this polymer has a pH value lying in the acid range. This acidic water-absorbing polymer may be at least partially neutralized by a polymer containing free basic groups, in an aspect amine groups, that is basic compared to the acidic polymer. These polymers are termed "Mixed-Bed Ion-Exchange Absorbent polymers" (MBIEA polymers) in the literature and are disclosed in, inter alia, WO 99/34843. As a rule, MBIEA polymers represent compositions that contain on the one hand basic polymers that are able to exchange anions, and on the other hand contain a polymer that is acidic compared to the basic polymer and that is able to exchange cations. The basic polymer contains basic groups and is typically obtained by the polymerization of monomers that carry basic groups or groups that can be converted into basic groups. These monomers include those that contain primary, secondary, or tertiary amines or the corresponding phosphines or at least two of the aforementioned functional groups. This group of monomers includes in particular ethyleneamine, allylamine, diallylamine, 4-aminobutene, alkyloxycycline, vinylformamide, 5-aminopentene, carbodiimide, formaldacin, melanin and the like, as well as their secondary or tertiary amine derivatives.

Monoethylenically unsaturated, acidic groups-containing monomers ($\alpha$1) can be acrylic acid, methacrylic acid, ethacrylic acid, $\alpha$-chloroacrylic acid, $\alpha$-cyanoacrylic acid, $\beta$-methylacrylic acid (crotonic acid), $\alpha$-phenylacrylic acid, $\beta$-acryloxypropionic acid, sorbinic acid, $\alpha$-chlorosorbinic acid, 2'-methylisocrotonic acid, cinnamic acid, p-chlorocinnamic acid, $\beta$-stearic acid, itaconic acid, citraconic acid, mesaconic acid, glutaconic acid, aconitic acid, maleic acid, fumaric acid, tricarboxythylene and maleic acid anhydride, wherein acrylic acid and methacrylic acid are one aspect and acrylic acid is another aspect.

Besides these carboxylate group-containing monomers, further monoethylenically unsaturated acidic group-containing monomers ($\alpha$1) can be ethylenically unsaturated sulfonic acid monomers or ethylenically unsaturated phosphonic acid monomers.

Ethylenically unsaturated sulfonic acid monomers can be allylsulfonic acid or aliphatic or aromatic vinylsulfonic acids or acrylic or methacrylsulfonic acids. In one aspect, aliphatic or aromatic vinylsulfonic acids can be vinylsulfonic acid, 4-vinylbenzylsulfonic acid, vinyltoluenesulfonic acid and styrenesulfonic acid. In one aspect, acrylic or methacrylic acids can be sulfoethyl(meth)acrylate, sulfopropyl(meth) acrylate and 2-hydroxy-3-methacryloxypropylsulfonic acid, as well as (meth)acrylamidoalkylsulfonic acids such as 2-acrylamido-2-methylpropane sulfonic acid.

As ethylenically unsaturated phosphonic acid, monomers such as vinylphosphonic acid, allylphosphonic acid, vinylbenzylphosphonic acid, (meth)acrylamidoalkylphosphonic acids, acrylamidoalkyldiphosphonic acids, phosphonomethylated vinylamines, and (meth)acrylphosphonic acid derivatives are one aspect.

According to an embodiment of the present invention, the polymer can comprise at least about 50 wt. % in one aspect, in another aspect at least about 70 wt. %, and in yet another aspect at least about 90 wt. % carboxylate group-containing monomers. In another aspect according to the present invention, the polymer can comprise at least about 50 wt. % in one aspect, and in another aspect at least about 70 wt. % acrylic acid, which is neutralized in one aspect to at least about 20 mol %, and in another aspect to at least about 50 mol %.

In one aspect, ethylenically unsaturated monomers (α1) containing a protonated nitrogen can be dialkylaminoalkyl (meth)acrylates in the protonated form, for example dimethylaminoethyl(meth)acrylate hydrochloride or dimethylaminoethyl(meth)acrylate hydrosulfate, as well as dialkylaminoalkyl(meth)acrylamides in the protonated form, for example dimethylaminoethyl(meth)acrylamide hydrochloride, dimethylaminopropyl(meth)acrylamide hydrochloride, dimethylaminopropyl(meth)acrylamide hydrosulfate, or dimethylaminoethyl(meth)acrylamide hydrosulfate.

Ethylenically unsaturated monomers (α1) containing a quaternated nitrogen can be dialkylammoniumalkyl(meth)acrylates in quaternated form, for example trimethylammoniummethyl(meth)acrylate-methosulfate or dimethylethylammoniummethyl(meth)acrylate-ethosulfate as well as (meth)acrylamidoalkyldialkylamine in quaternated form, for example (meth)acrylamidopropyltrimethylammonium chloride, trimethylammoniumethyl(meth)acrylate chloride, or (meth)acrylamidopropyltrimethylammonium sulfate.

Monoethylenically unsaturated monomers (α2) which can be co-polymerized with (α1) include acrylamides and (meth)acrylamides.

(Meth)acrylamides besides acrylamide and methacrylamide include alkyl-substituted (meth)acrylamides or aminoalkyl-substituted derivatives of (meth)acrylamide such as N-methylol(meth)acrylamide, N,N-dimethylamino(meth)acrylamide, dimethyl(meth)acrylamide or diethyl(meth)acrylamide. Possible vinylamides are for example N-vinylamides, N-vinylformamides, N-vinylacetamides, N-vinyl-N-methylacetamides, N-vinyl-N-methylformamides, vinylpyrrolidone. Among these, monomers acrylamide is an aspect.

Monoethylenically unsaturated monomers (α2) which are copolymerizable with (α1) can be water-dispersible monomers. In one aspect, water-dispersible monomers can be acrylic acid esters and methacrylic acid esters, such as methyl (meth)acrylate, ethyl(meth)acrylate, propyl(meth)acrylate or butyl(meth)acrylate, as well as vinylacetate, styrene, and isobutylene.

Cross-linkers (α3) according to the present invention can be compounds which have at least two ethylenically unsaturated groups in one molecule (cross-linker class I), compounds which have at least two functional groups which can react with functional groups of the monomers (α1) or (α2) in a condensation reaction (=condensation cross-linkers), in an addition reaction or a ring-opening reaction (cross-linker class II), compounds which have at least one ethylenically unsaturated group and at least one functional group which can react with functional groups of the monomers (α1) or (α2) in a condensation reaction, an addition reaction or a ring-opening reaction (cross-linker class III), or polyvalent metal cations (cross-linker class IV). Thus, with the compounds of cross-linker class I, a cross-linking of the polymer is achieved by radical polymerization of the ethylenically unsaturated groups of the cross-linker molecules with the monoethylenically unsaturated monomers (α1) or (α2), while with the compounds of cross-linker class II and the polyvalent metal cations of cross-linker class IV, a cross-linking of the polymer is achieved via condensation reaction of the functional groups (cross-linker class II) or via electrostatic interaction of the polyvalent metal cation (cross-linker class IV) with the functional groups of the monomer (α1) or (α2). With compounds of cross-linker class III, a cross-linking of the polymers is achieved by radical polymerization of the ethylenically unsaturated groups as well as by condensation reaction between the functional groups of the cross-linkers and the functional groups of the monomers (α1) or (α2).

In one aspect, compounds of cross-linker class I can be poly(meth)acrylic acid esters, which have been obtained for example by conversion of a polyol, such as for example ethylene glycol, propylene glycol, trimethylolpropane, 1,6-hexanediol, glycerine, pentaerythritol, polyethyleneglycol or polypropyleneglycol, of an aminoalcohol, a polyalkylenepolyamine, such as for example diethylenetriamine or triethylenetetraamine, or of an alkoxidized polyol with acrylic acid or methacrylic acid. In another aspect, compounds of cross-linker class I can be polyvinyl compounds, poly(meth)allyl compounds, (meth)acrylic acid esters of a monovinyl compound or (meth)acrylic acid esters of a mono(meth)allyl compound, in one aspect of the mono(meth)allyl compounds of a polyol or of an aminoalcohol. In this context, DE 195 43 366 and DE 195 43 368 are referred to.

Examples of compounds of cross-linker class I are alkenyldi(meth)acrylates, for example ethyleneglycoldi(meth)acrylate, 1,3-propyleneglycoldi(meth)acrylate, 1,4-butyleneglycoldi(meth)acrylate, 1,3-butyleneglycoldi(meth)acrylate, 1,6-hexanedioldi(meth)acrylate, 1,10-decanedioldi(meth)acrylate, 1,12-dodecanedioldi(meth)acrylate, 1,18-octadecanedioldi(meth)acrylate, cyclopentanedioldi(meth)acrylate, neopentylglycoldi(meth)acrylate, methylenedi(meth)acrylate or pentaerythritoldi(meth)acrylate, alkenyldi(meth)acrylamides, for example N-methyldi(meth)acrylamide, N,N'-3-methylbutylidenebis(meth)acrylamide, N,N'-(1,2-dihydroxyethylene)bis(meth)acrylamide, N,N'-hexamethylenebis(meth)acrylamide or N,N'-methylenebis(meth)acrylamide, polyalkoxydi(meth)acrylates, for example diethyleneglycoldi(meth)acrylate, triethyleneglycoldi(meth)acrylate, tetraethyleneglycoldi(meth)acrylate, dipropyleneglycoldi(meth)acrylate, tripropyleneglycoldi(meth)acrylate or tetrapropyleneglycoldi(meth)acrylate, bisphenol-A-di(meth)acrylate, ethoxylated bisphenol-A-di(meth)acrylate, benzylidenedi(meth)acrylate, 1,3-di(meth)acryloyloxypropanol-2, hydroquinonedi(meth)acrylate, di(meth)acrylate esters of trimethylolpropane which is alkoxylated, in one aspect ethoxylated, in one aspect with about 1 mol to about 30 mol alkylene oxide per hydroxyl group, thioethyleneglycoldi(meth)acrylate, thiopropyleneglycoldi(meth)acrylate, thiopolyethyleneglycoldi(meth)acrylate, thiopolypropyleneglycoldi(meth)acrylate, divinyl ethers, for example 1,4-butanedioldivinyl ether, divinyl esters, for example divinyl adipate, alkanedienes, for example butadiene or 1,6-hexadiene, divinylbenzene, di(meth)allyl compounds, for example di(meth)allyl phthalate or di(meth)allyl succinate, homo- and co-polymers of di(meth)allyldimethylammonium chloride and homo- and co-polymers of diethyl(meth)allylaminomethyl(meth)acrylateammonium chloride, vinyl(meth)acrylic compounds, for example vinyl (meth)acrylate, (meth)allyl(meth)acrylic compounds, for example (meth)allyl(meth)acrylate, (meth)allyl(meth)acrylate ethoxylated with about 1 mol to about 30 mol ethylene oxide per hydroxyl group, di(meth)allyl esters of polycarboxylic acids, for example di(meth)allyl maleate, di(meth)allyl fumarate, di(meth)allyl succinate or di(meth)allyl terephthalate, compounds with 3 or more ethylenically unsaturated, radically polymerizable groups such as for example glycerine tri(meth)acrylate, (meth)acrylate esters of glycerine ethoxylated with in one aspect about 1 mol to about 30 mol ethylene oxide per hydroxyl group, trimethylolpropanetri(meth)acrylate, tri(meth)acrylate esters of trimethylolpropane which is alkoxylated, in one aspect ethoxylated, in one aspect with about 1 mol to about 30 mol alkylene oxide per hydroxide group, trimethacrylamide, (meth)allylidenedi(meth)acrylate, 3-allyloxy-1,2-propanedioldi(meth)acrylate, tri(meth)allylcyanurate, tri(meth)allylisocyanurate, pentaerythritoltetra(meth)acrylate, pentaerythritoltri(meth)acrylate, (meth)acrylic acid esters of pentaerythritol which is ethoxylated with in one aspect about 1 mol to about 30 mol ethylene oxide per hydroxyl group, tris(2-hydroxyethyl)isocyanuratetri(meth)acrylate, trivinyltrimellitate, tri(meth)allylamine, di(meth)allylalkylamines, for example di(meth)allylmethylamine, tri(meth)allylphosphate, tetra(meth)allylethylenediamine, poly(meth)allyl ester, tetra(meth)allyloxyethane or tetra(meth)allylammonium halides.

Compounds of cross-linker class II can be compounds which have at least two functional groups which can react in a condensation reaction (=condensation cross-linkers), in an addition reaction or in a ring opening reaction with the functional groups of the monomers ($\alpha 1$) or ($\alpha 2$), in one aspect with acidic groups of the monomers ($\alpha 1$). These functional groups of the compounds of cross-linker class II are alcohol, amine, aldehyde, glycidic, isocyanate, carbonate or epichloro functions.

Examples of compounds of cross-linker class II are polyols, for example ethylene glycol, polyethylene glycols such as diethylene glycol, triethylene glycol and tetraethylene glycol, propylene glycol, polypropylene glycols such as dipropylene glycol, tripropylene glycol or tetrapropylene glycol, 1,3-butanediol, 1,4-butanediol, 1,5-pentanediol, 2,4-pentanediol, 1,6-hexanediol, 2,5-hexanediol, glycerine, polyglycerine, trimethylolpropane, polyoxypropylene, oxyethylene-oxypropylene block copolymers, sorbitan-fatty acid esters, polyoxyethylene sorbitan-fatty acid esters, pentaerythritol, polyvinylalcohol and sorbitol, aminoalcohols, for example ethanolamine, diethanolamine, triethanolamine or propanolamine, polyamine compounds, for example ethylenediamine, diethylenetriamine, triethylenetetraamine, tetraethylenepentaamine or pentaethylenehexaamine, polyglycidyl ether compounds such as ethyleneglycoldiglycidyl ether, polyethyleneglycoldiglycidyl ether, glycerinediglycidyl ether, glycerinepolyglycidyl ether, pentaerithritolpolyglycidyl ether, propyleneglycoldiglycidyl ether, polypropyleneglycoldiglycidyl ether, neopentylglycoldiglycidyl ether, hexanediolglycidyl ether, trimethylolpropanepolyglycidyl ether, sorbitolpolyglycidyl ether, phthalic acid diglycidyl ester, adipinic acid diglycidyl ether, 1,4-phenylenebis(2-oxazoline), glycidol, polyisocyanates, preferably diisocyanates such as 2,4-toluenediioscyanate and hexamethylenediisocyanate, polyaziridine compounds such as 2,2-bishydroxymethylbutanol-tris[3-(1-aziridinyl)propionate], 1,6-hexamethylenediethylene urea and diphenylmethane-bis-4,4'-N,N'-diethylene urea, halogen epoxides for example epichloro- and epibromohydrin and $\alpha$-methylepichlorohydrin, alkylene carbonates such as 1,3-dioxolane-2-one (ethylene carbonate), 4-methyl-1,3-dioxolane-2-one (propylene carbonate), 4,5-dimethyl-1,3-dioxolane-2-one, 4,4-dimethyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxolane-2-one, poly-1,3-dioxolane-2-on, polyquaternary amines such as condensation products from dimethylamines and epichlorohydrin. In another aspect, compounds of the cross-linker class II can be polyoxazolines such as 1,2-ethylenebisoxazoline, cross-linkers with silane groups such as $\gamma$-glycidooxypropyltrimethoxysilane and $\gamma$-aminopropyltrimethoxysilane, oxazolidinones such as 2-oxazolidinone, bis- and poly-2-oxazolidinone, and diglycolsilicates.

Compounds of class III can be hydroxyl or amino group-containing esters of (meth)acrylic acid, such as for example 2-hydroxyethyl(meth)acrylate and 2-hydroxypropyl(meth)acrylat, as well as hydroxyl or amino group-containing (meth)acrylamides, or mono(meth)allylic compounds of diols.

The polyvalent metal cations of cross-linker class IV are derived in one aspect from singly or multiply charged cations, the singly charged in particular from alkali metals such as potassium, sodium, lithium, wherein lithium is one aspect. In one aspect, doubly charged cations are derived from zinc, beryllium, or alkaline earth metals such as magnesium, calcium, strontium, wherein magnesium is an aspect. Further cations applicable according to an embodiment of the present invention, with higher charge, are cations from aluminium, iron, chromium, manganese, titanium, zirconium, and other transition metals as well as double salts of such cations or mixtures of the named salts. The use of aluminium salts and alums and various hydrates thereof such as e.g. $AlCl_3 \cdot 6H_2O$, $NaAl(SO_4)_2 \cdot 12H_2O$, $KAl(SO_4)_2 \cdot 12H_2O$ or $Al_2(SO_4)_3 \cdot 14$-$18H_2O$ is one aspect.

The use of $Al_2(SO_4)_3$ and its hydrates as cross-linkers of the cross-linker class IV is another aspect.

The superabsorbent polymer fine particles used in the process according to the invention are in one aspect cross-linked by cross-linkers of the following cross-linker classes or by cross-linkers of the following combinations of cross-linker classes: I, II, III, IV, III, I III, I IV, III III, I II IV, I III IV, II III IV, II IV or III IV. The above combinations of cross-linker classes represent an embodiment of cross-linkers of a superabsorbent polymer fine particle used in the process according to an embodiment of the present invention.

Other embodiments of the superabsorbent polymer fine particles used in the process according to the present invention are polymers which are cross-linked by any of the above named cross-linkers of cross-linker class I. Among these, water-soluble cross-linkers are an aspect. In this context, N,N'-methylenebisacrylamide, polyethylene glycol di(meth)acrylates, triallylmethylammonium chloride, tetraallylammonium chloride, as well as allylnonaethylene glycol acrylate made with 9 mol ethylene oxide per mol acrylic acid are another aspect.

Water-soluble polymers ($\alpha 4$) such as those comprising partially or fully saponified polyvinyl alcohol, polyvinylpyrrolidone, starches or starch derivatives, polyglycols or polyacrylic acids can in one aspect be polymerized into the superabsorbent polymer fine particles according to an embodiment of the present invention. The molecular weight of these polymers is not critical, as long as they are water-soluble. In one aspect, water-soluble polymers can be starches or starch derivatives or polyvinyl alcohol. The water-soluble polymers, in one aspect synthetic like polyvinyl alcohol, can also serve as graft basis for the monomers to be polymerized.

As auxiliary ($\alpha 5$), suspension agents, organic or inorganic particles such as for example odor binders, in particular zeolites or cyclodextrins, skin care substances, surface-active agents, or antioxidants are in one aspect included with the polymer fine particles.

The superabsorbent polymer fine particles used in the process according to the present invention are in one aspect obtainable by first producing a water-absorbing polymer (P) in particulate form from the above-named monomers and cross-linkers. The production of this polymer (P) which serves as starting material for the superabsorbent polymer fine particles in one aspect occurs by bulk polymerization, which occurs in one aspect in kneading reactors such as extruders or by belt polymerization, solution polymerization, spray polymerization, inverse emulsion polymerization and inverse suspension polymerization. Solution polymerization can be carried out in water as solvent. The solution polymerization can occur continuously or discontinuously. From the art, a broad spectrum of variation possibilities can be learned with respect to reaction proportions such as temperatures, type and quantity of the initiators as well as of the reaction solution. Typical processes are described in the following patent specifications: U.S. Pat. No. 4,286,082, DE 27 06 135, U.S. Pat. No. 4,076,663, DE 35 03 458, DE 40 20 780, DE 42 44 548, DE 43 23 001, DE 43 33 056, and DE 44 18 818.

As initiators for initiation of the polymerization, all initiators which form radicals under the polymerization conditions can be used, which are commonly used in the production of superabsorbent polymers. Thermal catalysts, redox catalysts, and photo-initiators that are activated by energetic radiation belong to this group. The polymerization initiators may be dissolved or dispersed in a solution of monomers according to an embodiment of the present invention. The use of water-soluble catalysts is one aspect.

Thermal initiators can be all compounds known to the person skilled in the art which decompose under the influence of temperature to form radicals. In one aspect are thermal polymerization initiators with a half-life of less than about 10 seconds, and in another aspect of less than about 5 seconds at less than about 180° C. in one aspect, and in another aspect at less than about 140° C. Thus, peroxides, hydroperoxides, hydrogen peroxide, persulfates, as well as azo compounds are in another aspect thermal polymerization initiators. In some cases, it is advantageous to use mixtures of different thermal polymerization initiators. Among such mixtures, those consisting of hydrogen peroxide and sodium or potassium peroxodisulfate are one aspect, which may be used in any desired ratio of amounts. Suitable organic peroxides can be acetylacetone peroxide, methyl ethyl ketone peroxide, benzoyl peroxide, lauroyl peroxide, acetyl peroxide, capryl peroxide, isopropylperoxydicarbonate, 2-ethylhexylperoxydicarbonate, tert-butyl hydroperoxide, cumene hydroperoxide, tert-amyl perpivalate, tert-butyl perpivalate, tert-butyl perneohexonate, tert-butyl isobutyrate, tert-butyl per-2-ethylhexenoate, tert-butyl perisononanoate, tert-butyl permaleate, tert-butyl perbenzoate, tert-butyl-3,5,5-trimethylhexanoate and amyl perneodecanoate. The following are another aspect as thermal polymerization initiators: azo compounds such as azobisisobutyronitrole, azobisdimethylvaleronitrile, 2,2'-azobis-(2-amidinopropane)dihydro-chloride, azo-bis-amidinopropane dihydrochloride, 2,2'-azobis-(N,N-dimethylene)isobutyramidine dihydrochloride, 2-(carbamoylazo)isobutyronitrile, and 4,4'-azobis-(4-cyanovaleric acid). The aforementioned compounds are used in conventional amounts, in one aspect in a range from about 0.01 mol. % to about 5 mol. %, an in another aspect from about 0.1 mol. % to about 2 mol. %, in each case based on the amount of the monomers to be polymerized.

The redox catalysts contain as oxidic component at least one of the per compounds listed above, and contain as reducing component in one aspect ascorbic acid, glucose, sorbose, mannose, ammonium or alkali metal hydrogensulfite, -sulfate, -thiosulfate, -hyposulfite or -sulfide, metal salts such as iron II ions or silver ions or sodium hydroxymethyl sulfoxylate. In one aspect, ascorbic acid or sodium pyrosulfite is used as reducing component of the redox catalyst. Based on the amount of monomers used in the polymerization, about $1 \times 10^{-5}$ to about 1 mol % of the reducing component of the redox catalyst and about $1 \times 10^{-5}$ to about 5 mol % of the oxidising component of the redox catalyst are used. Instead of the oxidizing component of the redox catalyst, or as a complement thereto, one or more, in one aspect, water-soluble azo compounds may be used.

If the polymerization is initiated by action of energetic beams, so-called photo-initiators are generally used. These can comprise for example so-called α-splitters, H-abstracting systems, or also azides. Examples of such initiators are benzophenone derivatives such as Michlers ketone, phenanthrene derivatives, fluorene derivatives, anthraquinone derivatives, thioxanthone derivatives, cumarin derivatives, benzoin ether and derivatives thereof, azo compounds such as the above-mentioned radical formers, substituted hexaarylbisimidazoles, or acylphosphine oxides. Examples of azides are: 2-(N,N-dimethylamino)ethyl-4-azidocinnamate, 2-(N,N-dimethylamino)ethyl-4-azidonaphthylketone, 2-(N,N-dimethylamino) ethyl-4-azidobenzoate, 5-azido-1-naphthyl-2'-(N,N-dimethylamino)ethylsulfone, N-(4-sulfonylazidophenyl)maleinimide, N-acetyl-4-sulfonylazidoaniline, 4-sulfonylazidoaniline, 4-azidoaniline, 4-azidophenacyl bromide, p-azidobenzoic acid, 2,6-bis(p-azidobenzylidene)cyclohexanone, and 2,6-bis(p-azidobenzylidene)-4-methylcyclohexanone. The photo-initiators, when used, are generally employed in quantities from about 0.01 wt. % to about 5 wt. % based on the monomers to be polymerized.

According to an embodiment of the present invention, a redox system comprising hydrogen peroxide, sodium peroxodisulfate and ascorbic acid is one aspect. Generally, the polymerization is initiated with the initiators in a temperature range of about 30° C. to about 90° C.

The polymerization reaction can be initiated by one initiator or by more than one initiator working together. Further, the polymerization can be carried out in such a way that initially one or more redox initiators are added. In the further course of the polymerization, additional thermal or photo-initiators are then applied, whereby in the case of photo-initiators, the polymerization reaction is then initiated by the effect of energetic radiation. The opposite order, i.e. the initial initiation of the reaction by means of energetic radiation and photo-initiators or thermal initiators and in the further course of the polymerization an initiation of the polymerization by means of one or more redox initiators, is also conceivable.

In order to convert the thus obtained polymers (P) into a particulate form, after their separation from the reaction mixture, these polymers can first be dried at a temperature within a range of about 20° C. to about 300° C. in one aspect, in another aspect within a range of about 50° C. to about 250° C., and in yet another aspect within a range from about 100° C. to about 200° C. to a water content of less than about 40 wt. % in one aspect, in another aspect of less than about 20 wt. % and in yet another aspect less than about 10 wt. %, based on the total weight of the polymer (P). The drying can occur in ovens or driers known to the skilled person, for example in belt driers, drying hurdles ("Hordentrockner"), rotary kilns, fluid bed driers, disc driers, paddle driers, or infrared driers. Should the thus obtained dried polymers (P) not yet be present in particulate form, then they are further comminuted after the drying. The comminuting can occur by dry-grinding, in one aspect by dry-grinding in a hammer mill, a pin mill, a ball mill, or a roll mill.

Besides the above described process for transforming the polymers (P) into a particulate form, the polymers can also be comminuted in the gel state by the process of wet grinding with any conventional device for wet grinding.

The particulate polymers (P) obtainable by the above-described process have in one aspect at least one, an in another aspect each, of the following properties:
(a1) the maximum absorption of an about 0.9 wt. % aqueous NaCl solution according to ERT 440.1-99 is within a range from about 10 ml/g to about 1000 ml/g in one aspect, in another aspect about 15 ml/g to about 500 ml/g, and in yet another aspect about 20 ml/g to about 300 ml/g;

(b1) the fraction that can be extracted with an about 0.9 wt. % aqueous NaCl solution according to ERT 470.1-99 is less than about 30 wt. % in one aspect, in another aspect less than about 20 wt. %, and in yet another aspect less than about 10 wt. %, based on the polymer (P);

(c1) the swelling time to achieve about 80% of the maximum absorption of an about 0.9 wt. % aqueous NaCl solution according to ERT 440.1-99 is within the range from about 0.01 wt. % to about 180 minutes in one aspect, in another aspect about 0.01 wt. % to about 150 minutes, and in yet another aspect about 0.01 wt. % to about 100 minutes;

(d1) the bulk density according to ERT 460.1-99 is within the range from about 300 g/l to about 1000 g/l in one aspect, in another aspect about 310 g/l to about 800 g/l, and in yet another aspect about 320 g/l to about 700 g/l;

(e1) the pH value according to ERT 400.1-99 of about 1 g of the polymer (P) in 1 l of water is within the range from about 4 to about 10 in one aspect, in another aspect about 5 to about 9, and in yet another aspect about 5.5 to about 7.5;

(f1) the Centrifuge Retention Capacity (CRC) according to ERT 441.1-99 is within the range from about 10 g/g to about 100 g/g in one aspect, in another from about 15 g/g to about 80 g/g, and in yet another from about 20 g/g to about 60 g/g; and/or (g1) the Absorption Against Pressure (AAP) at a pressure of about 21 $g/cm^2$ according to ERT 442.1-99 is within the range of about 10 to about 60 in one aspect, in another aspect about 15 to about 50, and in yet another aspect about 20 to about 40 g/g.

Polymers (P), which can serve as starting material for the superabsorbent polymer fine particles used in the process according to an embodiment of the present invention, are characterized by the following properties or property combinations: a1, b1, c1, d1, e1, f1, g1, a1b1, a1c1, a1d1, a1e1, a1f1, a1g1, a1b1c1, a1b1d1, a1b1e1, a1b1f1, a1b1g1, a1c1d1, a1c1e1, a1c1f1, a1c1g1, a1d1e1, a1d1f1, a1d1g1, a1e1f1, a1e1g1, a1f1g1, or a1b1c1d1e1f1g1.

The superabsorbent polymer fine particles used in the process according to an embodiment of the present invention are obtainable by sieving away the particles based on the polymer (P) obtainable, dried and optionally comminuted by the above-described process. For this purpose, these particles are introduced into a sieve with a mesh of about 150 μm. In this way, those particles which have a particle size of less than about 150 μm can be separated from the remaining particles. The polymer particles separated in this way with a particle size of less than about 150 μm are used in the process according to an embodiment of the present invention as superabsorbent polymer fine particles. In principle, however, all superabsorbent polymer fine particles with a particle size of less than about 150 μm can be used in the process according to an embodiment of the present invention, which form as fine particles in the production of superabsorbent polymer particles, independent of how the superabsorbent polymer fine particles have been separated from the remaining superabsorbent polymer particles.

In one embodiment of the process according to the present invention, as superabsorbent polymer fine particles, particles are used which have an inner portion and a surface portion bordering the inner portion and wherein the surface portion comprises a different chemical composition to the inner portion or differs from the inner portion in a physical property. Physical properties in which the inner portion differs from the surface portion are, for example, the charge density or the degree of crosslinking.

These superabsorbent polymer fine particles comprising an inner portion and a surface portion bordering the inner portion can be obtainable by post crosslinking reactive groups of the superabsorbent polymer fine particles near to the surface before or after their separation from the remaining particles of the particulate polymer (P). This post crosslinking can occur thermally, photochemically, or chemically.

A post crosslinker can be the compounds of crosslinker classes II and IV mentioned in the context of the crosslinkers (α3).

Among these compounds, as post crosslinker diethylene glycol, triethylene glycol, polyethylene glycol, glycerine, polyglycerine, propylene glycol, diethanolamine, triethanolamine, polyoxipropylene, oxiethylene-oxipropylene block copolymers, sorbitan fatty acid esters, polyoxiethylene sorbitan fatty acid esters, trimethylolpropane, pentaerythritol, polyvinylalcohol, sorbitol, 1,3-dioxolane-2-on (ethylene carbonate), 4-methyl-1,3-dioxolane-2-on (propylene carbonate), 4,5-dimethyl-1,3-dioxolan-2-on, 4,4-dimethyl-1,3-dioxolan-2-on, 4-ethyl-1,3-dioxolan-2-on, 4-hydroxymethyl-1,3-dioxolan-2-on, 1,3-dioxane-2-on, 4-methyl-1,3-dioxane-2-on, 4,6-dimethyl-1,3-dioxane-2-on, 1,3-dioxolane-2-on, and poly-1,3-dioxolane-2-on are one aspect. In another aspect, ethylene carbonate is used as post crosslinker.

Embodiments of the superabsorbent polymer fine particles include those which are post crosslinked by crosslinkers of the following crosslinker classes or by crosslinkers of the following combinations of crosslinker classes; II, IV, or II and IV.

A post crosslinker can be used in post crosslinking in a quantity within a range of about 0.01 wt. % to about 30 wt. % in one aspect, in another aspect in a quantity within a range of about 0.1 wt. % to about 20 wt. %, and in yet another aspect in a quantity within a range of about 0.3 wt. % to about 5 wt. %, based on the weight of the superabsorbent polymers.

Post crosslinking can occur by bringing into contact a fluid $F_1$ comprising a solvent, in one aspect water, organic solvents miscible with water such as methanol or ethanol or mixtures of at least two thereof, and the post crosslinker, with the outer portion of the polymer particles at a temperature within a range of about 30° C. to about 300° C. in one aspect, and in another aspect within a range of about 100° C. to about 200° C. The bringing into contact can occur by spraying on the fluid $F_1$ onto the polymer particles and then mixing the polymer particles brought into contact with the fluid $F_1$. The post crosslinker is comprised in the fluid $F_1$ in one aspect in a quantity within a range of about 0.01 wt. % to about 20 wt. %, and in another aspect in a quantity within a range from about 0.1 wt. % to about 10 wt. % based on the total weight of the fluid $F_1$. In another aspect, the fluid $F_1$ is brought into contact with the polymer particles in a quantity within a range of about 0.01 wt. % to about 50 wt. % in one aspect, and in another aspect in a quantity within a range from about 0.1 wt. % to about 30 wt. %, based on the weight of the polymer particles.

The fluid used in the process according to an embodiment of the present invention in process step (A) comprises in one aspect a solvent as well as the crosslinkable, uncrosslinked polymer. As solvent, in one aspect water or polar solvents miscible with water such as acetone, methanol, ethanol, 2-propanol or mixtures of at least two thereof are used. The uncrosslinked polymer can be dissolved or dispersed in the solvent.

In one embodiment of the process according to the present invention, the fluid comprises from about 18 wt. % to about 70 wt. % in one aspect, and in another aspect from about 19 wt. % to about 55 wt. %, based on the fluid of the crosslinkable, uncrosslinked polymer.

The crosslinkable, uncrosslinked polymer can be based on:
(β1) about 20 wt. % to about 100 wt. % in one aspect, in another aspect about 50 wt. % to about 98.99 wt. %, and in yet another aspect about 90 wt. % to about 98.95 wt. % polymerized, ethylenically unsaturated, acid groups-containing monomers or salts thereof;
(β2) 0 wt. % to about 70 wt. % in one aspect, in another aspect about 1 wt. % to about 60 wt. %, and in yet another aspect about 1 wt. % to about 40 wt. % polymerized, ethylenically unsaturated monomers co-polymerizable with (α1); and
(β3) 0 wt. % to about 10 wt. % in one aspect, in another aspect about 0.01 wt. % to about 7 wt. %, and in yet another aspect about 0.05 to about 5 wt. % of the monomer which can react with polymerized acid groups-bearing monomers, in one aspect with polymerized acid groups-containing monomers in the surface portion of the superabsorbent polymer fine particles or with other polymerized acid groups-containing monomers (M) in the crosslinkable, uncrosslinked polymer in a condensation reaction, in an addition reaction or in a ring-opening reaction, in one aspect with energy input,
wherein the sum of the components (β1) to (β3) amounts to about 100 wt. %.

Condensation reactions include a formation of ester, amide, imide or urethane bonds, whereby the formation of ester bonds is an aspect. These ester bonds are in one aspect formed by the reaction of an OH—group of the crosslinkable, uncrosslinked polymer with an acid group of the superabsorbent polymer fine particle or with an acid group of the crosslinkable, uncrosslinked polymer.

The acid groups-containing monomers (β1) are in one aspect neutralized to at least about 10 mol. %, in another aspect to at least about 20 mol. %, in yet another aspect to at least about 40 mol. %, and in even yet another aspect within the range of about 45 mol. % to about 55 mol. %. The neutralization of the monomers can occur before, during, or after the production of the crosslinkable, uncrosslinked polymer. The neutralization can occur with those bases which have already been mentioned in the context of the neutralization of the acid groups-bearing monomers (α1). Additionally, bases for neutralization of the uncrosslinked polymers can also be used which comprise ammonium, calcium, or magnesium cations. In this context, in one aspect bases are ammonium carbonate, ammonia, calcium carbonate, calcium hydroxide, magnesium hydroxide, and magnesium carbonate. As monomers (β1) and (β2) in one aspect are those monomers that also can be used as monomers (α1) or (α2).

In principle, as monomer (M) or (β3), all monomers suitable to the skilled person, in particular those of crosslinker class III, are considered. In one aspect, monomers (β3) are the conversion products of saturated aliphatic, cycloaliphatic, aromatic alcohols, amines, or thiols with ethylenically unsaturated carboxylic acids, reactive carboxylic acid derivatives or allyl halides. Examples include: (meth)allylalcohol, (meth)allylamine, hydroxyl or amino groups-containing esters of (meth)acrylic acid, such as hydroxyalkyl acrylates, in particular hydroxymethyl(meth)acrylate, 2-hydroxyethyl (meth)acrylate or 2-hydroxypropyl(meth)acrylate, aminoalkyl(meth)acrylates, in particular amino methyl(meth) acrylate, 2-amino ethyl(meth)acrylate or 2-aminopropyl (meth)acrylate, mono(meth)allyl compounds of polyols, in one aspect of diols such as for example polyethylene glycols or polypropylene glycols, as well as glycidylalkyl(meth) acrylates, such as glycidyl(meth)acrylate.

Crosslinkable, uncrosslinked polymers that are used in a process according to an embodiment of the present invention are those polymers which are based on about 1 wt. % to about 80 wt. % in one aspect, in another aspect about 1 wt. % to about 60 wt. %, in yet another aspect on about 1 wt. % to about 20 wt. % (meth)acrylamide, and on about 20 wt. % to about 99 wt. % in one aspect, in another aspect on about 40 wt. % to about 99 wt. %, and in yet another aspect on about 80 wt. % to about 99 wt. %, based on the total weight of the uncrosslinked polymer, on (meth)acrylic acid, whereby the (meth)acrylic acid is neutralized to at least about 10 mol. % in one aspect, in another aspect to at least about 20 mol. %, and in yet another aspect to at least about 50 mol. %.

A fluid used in a process according to an embodiment of the present invention comprises, besides the solvent and the crosslinkable, uncrosslinked polymer, a further, external crosslinker This is particularly the case if the crosslinkable, uncrosslinked polymer comprises no monomers (M) or (β3). In one aspect, external crosslinkers can be those of crosslinker classes II and IV, which were already mentioned in the context of the crosslinkers (α3). In another aspect, crosslinkers can be those which were mentioned as another aspect of crosslinkers of classes II and IV in the context of the monomers (α3). In yet another aspect in this context, the fluid can comprise the further external crosslinker in a quantity within the range of about 0.01 wt. % to about 30 wt. % in one aspect, in another aspect within a range of about 0.1 wt. % to about 15 wt. %, and in yet another aspect within a range of about 0.2 wt. % to about 7 wt. %, based on the weight of the uncrosslinked polymer.

In a process according to an embodiment of the present invention, the crosslinkable, uncrosslinked polymer has a weight average molecular weight determined by gel permeability chromatography of more than about 8,000 g/mol in one aspect, in another aspect a weight average molecular weight within a range of about 10,000 g/mol to about 1,000,000 g/mol, in yet another aspect within a range of about 50,000 g/mol to about 750,000 g/mol, and in even yet another aspect within a range of about 90,000 to about 700,000 g/mol.

Additionally, a fluid used in a process according to an embodiment of the present invention in process step (A) can have a viscosity determined according to ASTM 1824/90 at about 20° C. within a range of about 50 mPa·s to about 50,000 mPa·s in one aspect, in another aspect within a range of about 100 mPa·s to about 20,000 mPa·s, and in yet another aspect within a range of about 200 mPa·s to about 10,000 mPa·s.

A production of the crosslinkable, uncrosslinked polymer used in a process according to an embodiment of the present invention can occur by those processes which were already mentioned in the context of the production of the polymers (P) serving as starting material for the superabsorbent polymer fine particles. The fluids obtainable by this process comprising the crosslinkable, uncrosslinked polymer are optionally diluted by addition of solvent, whereby the quantity of crosslinkable, uncrosslinked polymer in the fluid should not exceed a value of about 80 wt. % in one aspect, in another aspect of about 60 wt. %, and in yet another aspect of about 40 wt. %, based on the total weight of the fluid, before they are applied in the process according to the present invention.

In another embodiment of a process according to the present invention, the fluid comprises further additives besides the solvent, the crosslinkable, uncrosslinked polymer and optionally the further crosslinker. These additives can also be polymerized into the crosslinkable, uncrosslinked polymer.

Additives can be substances that reduce the brittleness of the superabsorbent polymer particles produced by a process according to an embodiment of the present invention, such as polyethylene glycol, polypropylene glycol, mixed polyalkoxylates, polyalkoxylates based on polyols such as glycerine, trimethylolpropane or butanediol, surfactants with a HLB of more than about 10 such as alkyl polyglucosides or ethoxylated sugar esters, for example polysorbates under the trade name "TWEEN" from ICI. These additives also can act partially together as further crosslinkers, such as for example polyethylene glycol, polypropylene glycol, trimethylolpropane, or butanediol.

Additives can be agents that reduce the hardness of the superabsorbent polymer particles produced by a process according to an embodiment of the present invention, such as cationic surfactants such as alkyltrimethylamonnium chloride, dialkyldimethylammonium chloride, dimethylstearylammonium chloride, alkylbenzyldimethylammonium chloride or the corresponding methylsulfates, or quaternary tall oil fatty acid imidazolinium methosulfates. These additives can be used in quantities within a range of 0 wt. % to about 5 wt. % in one aspect, and in another aspect within a range of about 0.5 wt. % to about 4 wt. %, based on the weight of the uncrosslinked polymer. The additives can be added either before or after the polymerization. They bind the polycarboxylates by anion-cation interactions and affect the softening thereby. They affect at the same time an improvement of the absorption capacity for aqueous liquids. Another advantage of the substances is their biocidal effect, which prevents an undesired degradation of the swelling agent. This property is particularly important for some applications.

Additives can be separating agents, such as inorganic or organic powdery separating agents. These separating agents can be used in quantities within a range of 0 wt. % to about 2 wt. % in one aspect, and in another aspect within a range of about 0.1 wt. % to about 1.5 wt. %, based on the weight of the crosslinked polymer. In one aspect, separating agents can be wood flour, pulp fibers, powdery barks, cellulose powder, mineral filling agents such as perlite, synthetic filling agents such as nylon powder, rayon powder, diatom earth, bentonite, kaolin, zeolites, talc, loam, ashes, coal dust, magnesium silicates, fertilizers, or mixtures of the substances. Highly dispersed pyrogenic silicic acid as distributed under the trade name AEROSIL from Degussa is one aspect.

In an embodiment of a process according to the present invention, the superabsorbent polymer fine particles can be brought into contact with the fluid comprising the uncrosslinked polymer in the presence of an effect material based on a polysaccharide or on a silicon-oxygen-comprising compound or on a mixture of at least two thereof. Thus, the effect material can be comprised in the fluid or be mixed with the superabsorbent polymer fine particles before bringing the superabsorbent polymer fine particles into contact with the fluid. It is also possible that the effect material is dissolved or dispersed in a further fluid F' and brought into contact in the form of this solution or dispersion with the fluid with the superabsorbent polymer fine particles. Thus, a fluid F' can comprise, besides the effect material, in one aspect a liquid, whereby the liquid, such as water as well as organic solvents such as methanol or ethanol, or mixtures of at least two thereof, are one aspect, wherein water as the solvent is another aspect.

As polysaccharides are considered according to an embodiment of the present invention, all common starches and derivatives thereof known to the skilled person, as well as celluloses and derivatives thereof and cyclodextrins, wherein as cyclodextrins, α-cyclodextrin, β-cyclodextrin, γ-cyclodextrin, or mixtures of these cyclodextrins are an aspect.

As silicon-oxygen-comprising compounds, zeolites are an aspect. As zeolites, all synthetic or natural zeolites known to the skilled person can be used. Natural zeolites can be zeolites from the natrolite groups, the harmotone groups, the modenite groups, the chabasite groups, the faujasite groups (sodalite groups,) or the analcite groups. Examples of natural zeolites are Analcime, Leucite, Pollucite, Wairakite, Bellbergite, Bikitaite, Boggsite, Brewsterite, Chabazite, Willhendersonite, Cowlesite, Dachiardite, Edingtonite, Epistilbite, Erionite, Faujasite, Ferrierite, Amicite, Garronite, Gismondine, Gobbinsite, Gmelinite, Gonnardite, Goosecreekite, Harmotome, Phillipsite, Wellsite, Clinoptilolite, Heulandite, Laumontite, Levyne, Mazzite, Merlinoite, Montesommaite, Mordenite, Mesolite, Natrolite, Scolecite, Offretite, Paranatrolite, Paulingite, Perlialite, Barrerite, Stilbite, Stellerite, Thomsonite, Tschernichite oder Yugawaralite. Synthetic zeolites can be zeolite A, zeolite X, zeolite Y, zeolite P, or the product ABSCENTS.

As cations, zeolites used in a process according to an embodiment of the present invention can comprise alkali metal cations such as $Li^+$, $Na^+$, $K^+$, $Rb^+$, $Cs^+$ or $Fr^+$, and/or alkaline earth metal cations such as $Mg^{2+}$, $Ca^{2+}$, $Sr^{2+}$, or $Ba^{2+}$.

Zeolites of the so called "medium" ("mittlere") type can be used, in which the $SiO_2/AlO_2$ ratio is smaller than about 10 in one aspect, and in another aspect the $SiO_2/AlO_2$ ratio of these zeolites lies in a range of about 2 to about 10. Besides these "medium" zeolites, zeolites of the "high" ("hohe") type can furthermore be used, to which belong for example the known "molecular sieve" zeolites of the type ZSM as well as beta-zeolites. These "high" zeolites can be characterized by a $SiO_2/AlO_2$ ratio of at least about 35 in one aspect, and in another aspect by a $SiO_2/AlO_2$ ratio in a range of about 200 to about 500.

Zeolites can be used as particles with an average particle size within a range of about 1 μm to about 500 μm in one aspect, in another aspect within a range of about 2 μm to about 200 μm, and in yet another aspect within a range of about 5 μm to about 100 μm.

The effect materials can be used in a quantity within a range of about 0.1 wt. % to about 50 wt. % in one aspect, in another aspect within a range of about 1 wt. % to about 40 wt. %, and in yet another aspect in a quantity within a range of about 5 wt. % to about 30 wt. %, based on the weight of the superabsorbent polymer fine particles.

Besides the effect materials used in a process according to an embodiment of the present invention, deodorants, odor binders, or odor absorbers, or at least two thereof can be used. In one aspect, these are used in up to at most about 3 times the quantity of the effect material.

Deodorants (desodorants) act against body odors by covering or eliminating them. Body odors arise by the effect of skin bacteria on apocrine sweat, whereby unpleasant smelling degradation products are formed. Deodorants can be active substances such as germ inhibiting agents, enzyme inhibitors, odor absorbers, or odor coverers, as well as antiperspirants.

Germ inhibiting agents can be, in principle, all materials active against gram positive bacteria, such as e.g. 4-hydroxybenzoic acid and its salts and esters, N-(4-chlorophenyl)-N-(3,4-dichlorophenyl)urea, 2,4,4'-trichloro-2'-hydroxydiphenylether (Triclosan), 4-chloro-3,5-dimethylphenol, 2,2'-methylenebis(6-bromo-4-chlorophenol), 3-methyl-4-(1-methylethyl)phenol, 2-benzyl-4-chlorophenol, 3-(4-chlorophenoxy)-1,2-propanediol, 3-iodo-2-propenylbutylcarbamate, chlorohexidine, 3,4,4'-trichlorocarbonilide (TTC), antibacterial odorous substances, thymol, thyme oil, eugenol, clove oil, menthol, mint oil, framesol, phenoxyethanol, glycerine monocaprinate, glycerine monocaprylate, glycerine monolaurate (GML), diglycerine monocaprinate (DMC), salicylic acid-N-alkyl amides such as e.g. salicylic acid n-octylamide, or salicylic acid-n-decylamide.

Enzyme inhibitors such as esterase inhibitors are suitable. These can be trialkylcitrates such as trimethylcitrate, tripropylcitrate, triisopropylcitrate, tributylcitrate and in particular triethylcitrate (Hydagen™ CAT, Cognis GmbH, Düsseldorf, Germany). The materials inhibit enzyme activity and thereby reduce the formation of odors. Further materials which are considered as esterase inhibitors are sterolsulfates or -phosphates, such as for example lanosterol-, cholesterol-, campesterol-, stigmasterol- and sitosterolsulfate or -phosphate, dicarboxylic acids and esters thereof, such as for example glutaric acid, glutaric acid monoethyl ester, glutaric acid diethylester, adipinic acid, adipinic acid monoethyl ester, adipinic acid diethylester, malonic acid and malonic acid diethylester, hydroxycarboxylic acids, and esters thereof such as for example citric acid, maleic acid, tartaric acid or tartaric acid diethylesters, as well as zinc glycinate.

Odor absorbers include materials that can absorb and to a large extent retain odor-forming compounds. Odor absorbers can reduce the partial pressure of the individual components and thus also reduce their rate of dispersion. Odor absorbers have little if any effect on perfumes. Odor absorbers have no effect against bacteria. They comprise, for example, as main component a complex zinc salt of ricinoleic acid or special, to a large extent odor-neutral perfumes, which are known to the skilled person as "fixers," such as, e.g., extracts of labdanum or styrax or certain abietinic acid derivatives. Odorous substances or perfume oils act as odor coverers, which, in addition to their function as odor coverer, impart to the deodorants their respective fragrance notes. Perfume oils can be, for example, mixtures of natural and synthetic odorous substances. Natural odorous substances are extracts from flowers, stems and leaves, fruit, fruit peels, roots, woods, herbs and grasses, needles, and twigs, as well as resins and balsams. Furthermore, animal raw ingredients can be considered, such as for example cibet and castoreum. Typical synthetic odor substance compounds are products of the type esters, ethers, aldehydes, ketones, alcohols, and hydrocarbons. Odorous substance compounds of the ester type are, e.g., benzyl acetate, p-tert-butylcyclohexylacetate, linalyl acetate, phenylethyl acetate, linalyl benzoate, benzyl formate, allylcyclohexylpropionate, styralyl propionate and benzyl salicylate. Among the ethers are, for example, benzyl ethyl ethers, among the aldehydes, e.g., the linear alkanals with about 8 carbon atoms to about 18 carbon atoms, citral, citronellal, citronellyl oxyacetaldehyde, cyclamenaldehyde, hydroxycitronellal, lilial and bourgeonal, among the ketones e.g., the ionones and methylcedrylketone, among the alcohols anethole, citronellol, eugenole, isoeugenol, geraniol, linalool, phenylethylalcohol and terpineol, to the hydrocarbons belong principally the terpenes and balsams. In one aspect, however, mixtures of different odorous substances are used, which generate together a required fragrance. Ether oils of low volatility, which are mostly used as aroma components, are also suitable as perfume oils, e.g., sage oil, camomile oil, clove oil, Melissa oil, mint oil, cinnamon leaf oil, linden flower oil, juniper berry oil, vetiver oil, olibanum oil, galbanum oil, labdanum oil, and lavandine oil. In one aspect, bergamot oil, dihydromyrcen oil, lilial, lyral, citronellol, phenylethylalcohol, alpha-hexylcinnamaldehyde, geraniol, benzylacetone, cyclamenaldehyde, linalool, Boisambrene Forte, ambrosan, indole, hedione, sandelice, lemon oil, mandarine oil, orange oil, allylamyl glycolate, cyclovertal, lavendine oil, muscatel sage oil, beta-damscone, geranium oil, bourbon, cyclohexylsalicylate, vertofix coeur, iso-E-super, fixolide NP, evernyl, iraldein gamma, phenylacetic acid, geranyl acetate, benzyl acetate, rose oxide, romilat, irotyl, and floramat can be used alone or in mixtures.

Antiperspirants reduce sweat formation by influencing the activity of the ecrine perspiratory glands and thus act against underarm wetting and body odor. Salts of aluminium, zirconium, or zinc are suitable as astringent antiperspirant active substances. Such suitable antihydrotic acting active substances are, e.g., aluminium chloride, aluminium chlorohydrate, aluminium dichlorohydrate, aluminium sesquichlorohydrate and complex compounds thereof, e.g., with propylene glycol-1,2. aluminiumhydroxyallantoinate, aluminium chloride tartrate, aluminium zirconium trichlorohydrate, aluminium zirconium tetrachlorohydrate, aluminium zirconium pentachlorohydrate, and complex compounds thereof, e.g., with amino acids such as glycine.

In a process according to an embodiment of the present invention, a fluid is brought into contact with superabsorbent polymer fine particles in a quantity within a range of about 0.1 wt. % to about 500 wt. % in one aspect, in another aspect within a range of about 0.5 wt. % to about 300 wt. %, and in yet another aspect in a quantity within a range of about 1 wt. % to about 200 wt. %, based on the weight of the superabsorbent polymer fine particles.

Bringing the fluid into contact with the superabsorbent polymer fine particles can occur by mixing the fluid with the superabsorbent polymer fine particles or by spraying the superabsorbent polymer fine particles with the fluid. The contact can likewise occur in a fluidized bed.

All devices are suitable for mixing or spraying which allow a homogeneous distribution of the fluid on or with the superabsorbent polymer fine particles. Examples are Lödige mixer (produced by the company Gebrüder Lödige Maschinenbau GmbH), Gericke Multi-Flux mixer (produced by the company Gericke GmbH), DRAIS mixer (produced by the company DRAIS GmbH Spezialmaschinenfabrik Mannheim), Hossokawa mixer (Hosokawa Mokron Co., Ltd.), Ruberg mixer (produced by the company Gebrüder Ruberg GmbH & Co. KG, Nieheim), Hüttlin coater (produced by the company BWI Hüttlin GmbH Steinen), fluid-bed drier or spray granulators from AMMAG (produced by the company AMMAG Gunskirchen, Austria) or Heinen (produced by the company A. Heinen AG Anlagenbau Varel), Patterson-Kelley mixer, NARA shovel mixer, screw mixer, plate mixer, fluidized bed dryer, Shugi mixer, or PROCESSALL.

For bringing into contact in a fluidized bed, all fluidized bed processes known and appearing suitable to the skilled person can be applied. For example, a fluidized bed coater can be used.

In the second step (B of a process according to an embodiment of the present invention), the crosslinking of the uncrosslinked polymer can occur by heating the superabsorbent polymer fine particles brought into contact with the fluid, whereby in one embodiment of the process according to the present invention, the heating occurs during the bringing into contact of the superabsorbent polymer fine particles with the fluid.

The heating can occur in ovens or dryers known to the skilled person. In one aspect, the superabsorbent polymer fine particles brought into contact with the fluid are heated for about 1 minute to about 120 minutes, in another aspect for about 2 minutes to about 90 minutes, and in yet another aspect for about 3 minutes to about 60 minutes. The uncrosslinked polymer is crosslinked by the heating, whereby the crosslinking can occur by condensation reaction, addition reaction or ring opening reaction between the functional groups of the monomers (M) of the crosslinkable, uncrosslinked polymer and the functional groups, in one aspect the carboxylate groups, in the surface portion of the superabsorbent polymer fine particles or other functional groups, in one aspect carboxylate groups, of the crosslinkable, uncrosslinked polymer or by condensation reaction, addition reaction or ring opening reaction between the functional groups, in one aspect the carboxylate groups, of the uncrosslinked polymer and the functional groups, in one aspect the carboxylate groups, in the surface portion of the superabsorbent polymer fine particles, and the further crosslinker.

In another embodiment of a process according to the present invention, the superabsorbent polymer particles obtained by the above-described process, in one aspect a part of the superabsorbent polymer particles obtainable by the above-described process, in another aspect those superabsorbent polymer particles which have a particle size of more than about 850 μm, are comminuted, whereby the comminuting can occur by grinding.

In a further step (C), which can follow directly from step (B), a post crosslinker can be added during or after step (B). In the context of the addition of this post crosslinker, reference is made to the above details regarding post or surface crosslinking.

An embodiment of the present invention further relates to the superabsorbent polymer particles obtainable by the above-described process according to embodiments of the present invention.

Another embodiment of the present invention further relates to superabsorbent polymer particles comprising, to more than about 75 wt. % in one aspect, in another aspect to more than about 85 wt. %, in yet another aspect to more than 90.5 wt. %, in even yet another aspect to more than about 92 wt. %, and in even yet a further aspect to more than about 95 wt. %, superabsorbent polymer fine particles, wherein:

(A1) the superabsorbent polymer fine particles have, to at least about 40 wt. % in one aspect, in another aspect to at least about 70 wt. %, in yet another aspect to at least about 90 wt. %, and in even yet another aspect to about 100 wt. %, based on the total weight of the superabsorbent polymer fine particles, a particle size of less than about 150 μm, determined according to ERT 420.1-99, and abut at least partially onto a matrix of a crosslinked polymer, wherein preferably at least about 0.1 wt. % in one aspect, in another aspect at least about 1 wt. %, and in yet another aspect at least about 4 wt. %, based on the superabsorbent polymer particles, of crosslinked polymer form the matrix;

(A2) the crosslinked polymer is based to at least about 20 wt. % in one aspect, in another aspect to at least about 50 wt. %, in yet another aspect to at least about 80 wt. %, and in even yet another aspect at least about 90 wt. %, based on the total weight of the crosslinked polymer, on polymerized acid groups-bearing monomers or salts thereof;

(A3) the crosslinked polymer comprises a different chemical composition to the superabsorbent polymer fine particles or differs from the superabsorbent polymer fine particles in a physical property; and (A4) the superabsorbent polymer particles comprise a portion of particles with a particle size of less than about 150 μm, determined according to ERT 420.1-99 of less than about 50 wt. % in one aspect, in another aspect less than about 30 wt. %, in yet another aspect less than about 25 wt. %, in even yet another aspect less than 20 wt. %, in even yet a further aspect less than 15 wt. %, and in even yet another further aspect of less than 10 wt. %, based on the total weight of the superabsorbent polymer particles, after carrying out once the stability test described herein.

Yet another embodiment of the present invention also relates to superabsorbent polymer particles comprising superabsorbent polymer fine particles which have, to at least about 40 wt. % in one aspect, in another aspect to at least about 70 wt. %, in yet another aspect to at least about 90 wt. %, and in even yet another aspect to about 100 wt. %, based on the total weight of the superabsorbent polymer fine particles, a particle size of less than about 150 lam, determined according to ERT 420.1-99 and which at least partially abut onto a matrix of a crosslinked polymer, wherein:

(B1) the crosslinked polymer is based to at least about 20 wt. % in one aspect, in another aspect to at least about 50 wt. %, in yet another aspect to at least about 80 wt. %, and in even yet another aspect to at least about 90 wt. %, based on the total weight of the crosslinked polymer, on ethylenic, acid groups-bearing monomers or salts thereof;

(B2) the crosslinked polymer comprises a different chemical composition to the superabsorbent polymer fine particles or differs from the superabsorbent polymer fine particles in a physical property; and (B3) the matrix comprises, besides the crosslinked polymer, an effect material based on a polysaccharide or an a silicon-oxygen-comprising compound.

The effect materials can be comprised in a quantity within a range of about 0.1 wt. % to about 50 wt. % in one aspect, in another aspect within a range of about 1 wt. % to about 40 wt. %, and in yet another aspect in a quantity within a range of about 5 wt. % to about 30 wt. %, based on the total weight of superabsorbent polymer fine particles and crosslinked polymer.

Superabsorbent polymer fine particles that are comprised in both above-described superabsorbent polymer particles can be those which have already been described in the context of the above-described process for producing superabsorbent polymer particles. The crosslinked polymers in one aspect are those polymers which can be obtained by crosslinking the crosslinkable, uncrosslinked polymers described in the context of the process according to the present invention in the presence of superabsorbent polymer fine particles. The effect materials which are comprised in the last-cited superabsorbent polymer particles according to an embodiment of the present invention, correspond to those effect materials which have already been described in the context of a process according to an embodiment of the present invention for producing superabsorbent polymer particles, whereby zeolites can be comprised as effect materials. Furthermore, the matrix has the function of binding solidly together or agglomerating the individual superabsorbent polymer fine particles as well as the optionally present effect materials.

Physical properties in which the crosslinked polymer and the superabsorbent polymer fine particles can differ include the charge density, the degree of crosslinking or different reflection or absorption of electromagnetic waves. To determine these different properties, for example, microscope or nuclear resonance experiments can be used.

A crosslinked polymer can comprise in a quantity within a range of about 1 wt. % to about 50 wt. % in one aspect, in another aspect in a quantity within a range of about 3 wt. % to about 30 wt. %, and in yet another aspect in a quantity within a range of about 5 wt. % to about 20 wt. %, based on the total weight of crosslinked polymer and superabsorbent polymer fine particles.

Above-described superabsorbent polymer particles according to an embodiment of the present invention comprising the superabsorbent polymer fine particles can comprise an inner portion and a surface portion bordering the inner portion, wherein the surface portion comprises a different chemical composition to the inner portion or differs from the inner portion in a physical property. Physical properties in which the inner portion differs from the surface portion include, for example, the charge density or the degree of crosslinking.

These superabsorbent polymer particles according to an embodiment of the present invention comprising an inner portion and a surface portion bordering the inner portion can be obtained by post crosslinking superabsorbent polymer particle reactive groups close to the surface after process step (B). A process of the post crosslinking and the post crosslinkers used therefore correspond to those processes or those post crosslinkers which have already been described in the context of the post crosslinking of the polymer (P) or of the superabsorbent polymer fine particles.

In an embodiment of the above-described superabsorbent polymer particles, these have in an aspect at least one, and in one aspect each of the following properties:

a1) a particle size distribution, whereby at least about 80 wt. % in one aspect, in another aspect at least about 90 wt. %, and in yet another aspect at least about 95 wt. % of the particles have a particle size within a range of about 20 μm to about 5 mm in one aspect, in another aspect within the range of about 150 μm to about 1 mm, and in yet another aspect within the range of about 200 μm to about 900 μm according to ERT 420.1-99;

a2) a Centrifuge Retention Capacity (CRC) of at least about 5 g/g in one aspect, in another aspect at least about 10 g/g, and in yet another aspect within a range of about 20 g/g to about 100 g/g according to ERT 441.1-99;

a3) an Absorbency Against Pressure (AAP) at about 0.7 psi of at least about 5 g/g in one aspect, in another aspect at least about 7 g/g, and in yet another aspect within a range of about 15 g/g to about 100 g/g according to ERT 442-1.99; and a4) a water-soluble polymer content of less than about 25 wt. % in one aspect, in another aspect less than about 20 wt. %, and in yet anther aspect less than about 18 wt. %, based on the total weight of the superabsorbent polymer particles, according to ERT 470.1-99, after about 16 hours extraction.

Each of the feature combinations arising from features a1 to a4 represent an embodiment according to the present invention, whereby the following features or feature combinations represent embodiments: a4, a1a2, a1a2a3, a1a2a3a4, a1a3, a1a4, a1a3a4, a1a2a4, a2a3, a2a3a4, a2a4, as well as a3a4, wherein a4 and all the above combinations with a4 are one aspect. In another aspect, the above-described superabsorbent polymer particles according to an embodiment of the present invention have the same properties as the superabsorbent polymer particles obtainable by a process according to an embodiment of the present invention. According to an embodiment of the present invention, those values which have been given in the context of a process according to an embodiment of the present invention and the superabsorbent polymer particles according to an embodiment of the present invention as lower limits of features according to an embodiment of the present invention without upper limits, can have about 20 times in one aspect, in another aspect about 10 times, and in yet another aspect about 5 times the value of the lower limit.

An embodiment of the present invention further relates to a composite comprising superabsorbent polymer particles according to an embodiment of the present invention and a substrate. The superabsorbent polymer particles according to an embodiment of the present invention and the substrate can be solidly bound together. Substrates can be polymer films, such as for example polyethylene, polypropylene or polyamide, metals, non-woven materials, fluff, tissues, webs, natural or synthetic fibers, or other foams.

An embodiment of the present invention further relates to processes for producing a composite, wherein superabsorbent polymer particles according to an embodiment of the present invention and a substrate and optionally an additive are brought into contact together. Substrates used can be those substances which have already been cited above in the context of the composite according to an embodiment of the present invention.

An embodiment of the present invention also relates to a composite obtainable according to the above-described process.

Another embodiment of the present invention also relates to chemical products comprising the superabsorbent polymer particles according to the present invention or a composite according to the present invention. In one aspect, chemical products can be foams, formed bodies, fibers, films, sheets, cables, sealing materials, liquid-absorbing hygiene articles, carriers for plant or fungus growth regulating agents or plant protection active substances, additives for construction materials, packaging materials, or soil additives.

Yet another embodiment of the present invention further relates to the use of the superabsorbent polymer particles according to an embodiment of the present invention or of the composite according to an embodiment of the present invention in chemical products, in one aspect in the above-cited chemical products, as well as the use of the superabsorbent polymer particles according to an embodiment of the present invention as carrier for plant or fungus growth regulating agents or plant protection active substances. In the use as carrier for plant or fungus growth regulating agents or plant protection active substances, in one aspect, the plant or fungus growth regulating agent or plant protection active substance can be released over a time period controlled by the carrier.

An embodiment of the present invention further relates to the use of a fluid comprising:

a crosslinkable, uncrosslinked polymer which is based on ethylenic, acid groups-bearing monomers or salts thereof to at least about 20 wt. % in one aspect, in another aspect to at least about 30 wt. %, and in yet another aspect to at least about 50 wt. %, based on the total weight of the crosslinkable, uncrosslinked polymer, and which comprises, besides the polymerized, ethylenically unsaturated, acid groups-bearing monomers, further polymerized, ethylenically unsaturated monomers (M), which can react with polymerized acid groups-bearing monomers in a condensation reaction, in an addition reaction or in ring opening reaction, and optionally a crosslinker, to adjust at least one of the following properties:

B1) abrasion resistance of superabsorbent polymer particles which comprise superabsorbent polymer fine particles, B2) average particle size of superabsorbent polymer particles which comprise superabsorbent polymer fine particles, or for agglomeration of superabsorbent polymer fine particles and effect materials.

Another embodiment of the present invention further relates to the use of the superabsorbent polymer particles according to an embodiment of the present invention in hygiene products, in combating floods, for insulation against water, for regulating the water management of soils, or for treating food products.

Test Methods

Unless otherwise stated below, the measurements herein were conducted according to ERT processes. "ERT" stands for EDANA Recommended Test and "EDANA" for European Disposable And Nonwoven Association.

Stability Test 127 g of a grinding means (24 cylindrical porcelain pieces, US Stoneware ½" O.D. ½") as well as 10 g of the superabsorbent polymer particles with a particle size of 150 μm to 850 μm where weighed into a ball mill jar. The ball mill jar was closed and rotated for six minutes on a roll mill at 95 rpm. The mechanically stressed superabsorbent polymer was removed from the jar and analyzed with respect to particle distribution by means of a 100 mesh sieve. By determining the proportion of the particles which were retained on the sieve on sieving the superabsorbent polymer particles with the 100 mesh sieve according to the provisions of ERT 420.1-99 (and which accordingly have a particle size of more than 150 lam), by taking into account the quantity of superabsorbent polymer particles used, the portion could be determined which had a particle size of less than 150 μm.

EXAMPLES

I. Production of the Superabsorbent Polymer Fine Particles 300 g acrylic acid was divided into two portions. One portion was added to 429.1 g distilled water. 0.36 g triallylamine, 1.05 g allyloxypolyethylene glycol acrylic acid ester, and 12 g methoxypolyethylene glycol (22 EO) methacrlyate were dissolved in the second portion of acrylic acid and likewise added to the water. The solution was cooled to 10° C. Then, with cooling, a total of 233.1 g 50% sodium hydroxide were added so slowly that the temperature did not rise above 30° C. The solution was then flushed at 20° C. with nitrogen and thus further cooled. On reaching the start temperature of 4° C., 0.9 g sodium carbonate and the initiator solutions (0.1 g 2,2'-azobis-2-amidinopropane dihydrochloride in 10 g distilled water, 0.15 g sodium peroxodisulfate in 10 g distilled water and 0.1 g 30% hydrogen peroxide solution in 1 g distilled water and 0.01 g ascorbic acid in 2 g water) added. After the end temperature was reached, the gel produced was comminuted and dried at 150° C. over 90 minutes. The dried product was coarsely pound, ground and sieved according to the data in table 1.

II. Agglomeration of Superabsorbent Polymer Fine Particles in the Absence of Effect Materials Example 1

In a fluid bed coater Unilab-5-TJ of the company Hüttlin (BWI Hüttlin, Daimlerstraβe 7, D-79585 Steinen), 1,600 g of superabsorbent polymer fine particles of the particle distribution given in Table 1 from production example I were sprayed within 20 minutes with 400 g of a 20% solution of an uncrosslinked polyacrylic acid ($M_w$ approx. 100,000 g/mol) neutralized to 50 mol. % with sodium hydroxide, which comprised additionally 2% polyglycol 300 as crosslinker. The delivery temperature was 50° C., the product temperature 30° C. to 35° C., and 1,698 g of end product was obtained. The water content was increased by 1 percent relative to the water content of the polymer fine particles used. The product was kept for ten minutes in a circulating air covered at 190° C. The changes of the particle size distribution of the obtained reaction products are given in table 1.

TABLE 1

| Particle distribution [μm] | >850 | <850 >600 | <600 >300 | <300 >150 | <150 |
|---|---|---|---|---|---|
| Before spraying with the polyacrylate solution [wt. %] | 0.1 | 0.4 | 0.6 | 56.5 | 42.4 |
| After spraying with the polyacrylate solution [wt. %] | 0.2 | 4.6 | 28.6 | 64.9 | 1.7 |

Example 2

In a Labor-MIT mixer (MIT-Mischtechnik, Industrieanlagen GmbH, type LM 1,5/5, construction year 1995), 500 g of the superabsorbent polymer fine particles with the particle distribution given in table 2 from production example I were sprayed within 20 minutes with 175 g of 20% solution of an uncrosslinked polyacrylic acid ($M_w$ approx. 100,000 g/mol) neutralized to 50 mol. % with sodium hydroxide that additionally contained 1.8 wt. % 1,4-butanediol crosslinker and then dried for 30 minutes at 140° C. The changes to the particle size distribution of the obtained reaction products are given in table 2.

TABLE 2

| Particle distribution [μm] | >850 | <850 >600 | <600 >300 | <300 >150 | <150 |
|---|---|---|---|---|---|
| Before spraying with the polyacrylate solution [wt. %] | 0.1 | 0.2 | 0.4 | 54.3 | 45.7 |
| After spraying with the polyacrylate solution [wt. %] | 3.3 | 34.4 | 32.6 | 28.5 | 1.2 |

Example 3

In a Labor-MIT mixer (MIT-Mischtechnik, Industrieanlagen GmbH, type LM 1,5/5, construction year 1995), 150 g of the superabsorbent polymer fine particles with the particle distribution given in table 3 from production example I were sprayed within 20 minutes with 50 g of a 20% solution of an uncrosslinked polyacrylic acid (Mw approx. 130.000 g/mol), neutralized to 50 mol. % with sodium hydroxide, which additionally comprised 8.5 wt. % polyethylene glycol 300, based on the weight of the uncrosslinked polyacrylic acid, as crosslinker and then dried in the circulating air cupboard for the length of time and temperature given in table 3. The properties of the reaction products obtained can be seen in table 3.

TABLE 3

| Drying | 30 min/140° C. | 30 min/160° C. | 30 min/180° C. | Fine particles used according to production example I. |
|---|---|---|---|---|
| Stability | 17 wt.-% | 18 wt.-% | 17 wt.-% | |
| CRC value | 21.1 g/g | 21.1 g/g | 17.8 g/g | 23 g/g |
| AAP value | 9.9 g/g | 9.6 g/g | 11.7 g/g | 18.9 g/g |
| Soluble portion | 19.8 wt.-% | 18.6 wt.-% | 17.5 wt.-% | 11.2 wt.-% |
| Water content | 4.1 wt.-% | 3.4 wt.-% | 2.1 wt.-% | 3 wt.-% |

III. Post Crosslinking of Agglomerated Superabsorbent Polymer Fine Particles In a stirring beaker, to 50 g of the agglomerate obtained in example 1 was added a solution of 250 mg ethylene carbonate in a mixture of 1 g distilled water and 2 g acetone by means of a syringe and with stirring with a Krups 3-Mix stirrer on the highest level, and the agglomerate was further stirred for 30 seconds. The product was allowed to stand for 30 minutes and then dried for 30 minutes at 190° C. in a circulating air drying cupboard. The changes in the absorption properties are given in the following table 4:

TABLE 4

| Reaction product | CRC [g/g] | AAP 0.7 psi [g/g] |
|---|---|---|
| Superabsorbent polymer fine particles | 30.5 | 9.5 |
| Agglomerate | 24.8 | 10.1 |
| Post crosslinked agglomerate | 21.5 | 19.0 |

IV. Agglomeration of Superabsorbent Polymer Fine Particles in the Presence of Effect Materials

Example 5

In a Labor-MIT mixer already described under example 2, were placed 750 g superabsorbent polymer fine particles from production example I and combined at 1,500 rpm with 62.5 g of zeolite ABSCENTS 3000. The mixture was sprayed with 200 g of a 20% uncrosslinked polyacrylic acid solution (Mw approx. 130,000 g/mol) neutralized to 50 mol. % with sodium hydroxide, which comprised 3,4-polyethyleneglycol-300 as crosslinker, and then dried for 30 minutes at 180° C. in a circulating oven drying cupboard. The particles which were larger than 150 µm were ground in a cross-beater mill. The results are summarized in table 5.

TABLE 5

| Properties | Agglomerate 3 |
|---|---|
| Portion of particles <150 µm (before grinding) | 3.7 wt.-% |
| Portion of particles <150 µm (after grinding) | 11.2 wt.-% |
| Proportion of particles >850 µm (before grinding) | 34 wt.-% |
| Portion of particles between 150 µm and 850 µm (after grinding) | 88.8 wt.-% |
| Stability value | 15 wt.-% |
| CRC value | 25.5 g/g |
| AAP value at 0.7 psi | 10.6 g/g |
| Soluble portion | 19.8 wt. % |

The invention claimed is:

1. A process for producing an agglomerated superabsorbent polymer particle comprising less than about 10 wt. %, based on the total weight of the agglomerated superabsorbent polymer particle, of superabsorbent polymer fine particles having a particle size of less than about 150 µm, said process steps comprising:
(A) supplying (i) post crosslinked superabsorbent polymer fine particles having at least about 40 wt. %, based on the total weight of the agglomerated superabsorbent polymer particle, a particle size of less than about 150 µm
(B) spraying or mixing the post crosslinked superabsorbent polymer fine particles of (A) with a fluid comprising a) more than about 18 wt. % to about 55 wt %, based on the total weight of the fluid, of a cross-linkable, uncrosslinked polyacrylate solution neutralized to from about 45 mol % to about 55 mole %, which polyacrylate solution is based on polymerized, polyacrylic acid or salts thereof to at least about 20 wt. %, based on the total weight of the cross-linkable, uncrosslinked polymer, and b) a crosslinker;
(C) heating the post crosslinked superabsorbent polymer fine particles brought into contact with the fluid of step (B) to a temperature within a range from about 100 to about 200° C., so that the cross-linkable, uncross-linked polymer at least partially crosslinks to form agglomerated superabsorbent polymer particles having a particle size of more than about 850 µm; and
(D) comminuting the agglomerated superabsorbent polymer particles of step (C) to produce at least about 80 wt. % of the agglomerated superabsorbent polymer particles of step (C) to have a particle size within the range of about 200 µm to about 900 µm;
wherein
(a) the cross-linkable, uncross-linked polyacrylate solution comprises, besides the polymerized, ethylenically unsaturated, acid groups-bearing monomers, further polymerized, ethylenically unsaturated monomers (M) capable of reacting with polymerized acid group-bearing monomers in a condensation reaction, in an addition reaction, or in a ring opening reaction, and
(b) wherein the agglomerated superabsorbent polymer particle has less than about 10 wt. %, based on the total weight of the agglomerated superabsorbent polymer particle, of superabsorbent polymer fine particle size of less than about 150 µm.

2. The process according to claim 1, wherein the post crosslinked superabsorbent polymer fine particles comprise:
(α1) from about 0.1 wt. % to about 99.999 wt. % of polymerized, ethylenically unsaturated, acidic group-containing monomers or salts thereof, or polymerized, ethylenically unsaturated monomers containing a protonated or a quaternary nitrogen, or mixtures thereof, wherein mixtures comprising at least ethylenically unsaturated, acidic groups-containing monomers, preferably acrylic acid, are one aspect;

(α2) from 0 wt % to about 70 wt % of polymerized, ethylenically unsaturated monomers which can be co-polymerized with (α1);

(α3) from about 0.001 wt. % to about 10 wt. % of one or more cross-linkers;

(α4) from 0 wt % to about 30 wt % of water-soluble polymers;

(α5) from 0.3 wt % to about 5 wt % of hased on the weight of the superabsorbent polymer fine particles of a post crosslinker;

(α6) from 0 wt % to about 20 wt % of one or more auxiliaries, wherein the sum of the component weights (α1) to (α6) amounts to about 100 wt. %.

3. The process according to claim 1, wherein the crosslinkable, uncrosslinked polyacrylate solution comprises a weight average molecular weight of more than about 8000 g/mol.

4. The process according to claim 1, wherein the monomer (M) comprises a polymerized, ethylenically unsaturated conversion product of saturated aliphatic, cycloaliphatic, aromatic alcohols, amines or thiols with ethylenically unsaturated carboxylic acid, carboxylic acid derivatives or allyl halides.

5. The process according to claim 1, wherein the post-crosslinker is ethylene carbonate.

6. The process according to claim 1, wherein the bringing into contact of the superabsorbent polymer fine particles with the fluid occurs in the presence of an effect material comprising a polysaccharide or a polyalkylether polyol or a silicon-oxygen-comprising compound or a mixture of at least two thereof.

7. The process according to claim 6, wherein the effect material comprises a zeolite.

8. The process according to claim 1, wherein the bringing into contact occurs in a fluidized bed.

9. An agglomerated superabsorbent polymer particle obtained by a process according to claim 1.

10. The agglomerated superabsorbent polymer particles made according to the process of claim 1, wherein the agglomerated superabsorbent polymer particles have at least one of the following properties:

a1) a particle size distribution, whereby at least about 90 wt. % of the agglomerated superabsorbent polymer particles of step (C) to have a particle size within the range of about 200 μm to about 900 μm;

a2) a Centrifuge Retention Capacity (CRC) of at least about 5 g/g;

a3) an Absorption Against Pressure (AAP) at about 0.7 psi of at least about 5 g/g;

a4) a water-soluble polymer content of less than about 25 wt. % after about 16 hours extraction.

* * * * *

UNITED STATES PATENT AND TRADEMARK OFFICE
CERTIFICATE OF CORRECTION

PATENT NO. : 8,367,774 B2
APPLICATION NO. : 12/789644
DATED : February 5, 2013
INVENTOR(S) : Markus Frank It is certified that error appears in the above-identified patent and that said Letters Patent is hereby corrected as shown below:

<u>Column 1</u>,
Line 6, "7,776,984, now pending, which" should read -- 7,776,984, which --.

<u>Column 27</u>,
Line 8, "5 wt % of hased on" should read -- 5 wt % based on --.

Signed and Sealed this
Twenty-sixth Day of March, 2013

Teresa Stanek Rea
*Acting Director of the United States Patent and Trademark Office*